(12) United States Patent
Cho et al.

(10) Patent No.: US 10,157,227 B2
(45) Date of Patent: Dec. 18, 2018

(54) APPARATUS AND METHOD FOR GENERATING A SUMMARY IMAGE BY IMAGE PROCESSING

(71) Applicant: Hanwha Techwin Co., Ltd., Changwon-si (KR)

(72) Inventors: Sungbong Cho, Changwon-si (KR); Jeongwoong Park, Changwon-si (KR)

(73) Assignee: HANWHA AEROSPACE CO., LTD., Changwon-si (KR)

(*) Notice: Subject to any disclaimer, the term of this patent is extended or adjusted under 35 U.S.C. 154(b) by 37 days.

(21) Appl. No.: 14/931,222

(22) Filed: Nov. 3, 2015

(65) Prior Publication Data
US 2016/0127697 A1    May 5, 2016

(30) Foreign Application Priority Data
Nov. 5, 2014 (KR) ........................ 10-2014-0152865

(51) Int. Cl.
| | |
|---|---|
| G06K 9/00 | (2006.01) |
| H04N 7/18 | (2006.01) |
| G06F 17/30 | (2006.01) |
| G08B 25/08 | (2006.01) |
| H04N 5/232 | (2006.01) |
| G08B 13/196 | (2006.01) |

(52) U.S. Cl.
CPC ... *G06F 17/30843* (2013.01); *G06K 9/00751* (2013.01); *G08B 13/19602* (2013.01); *G08B 13/19654* (2013.01); *G08B 13/19669* (2013.01); *G08B 13/19684* (2013.01); *H04N 7/183* (2013.01); *H04N 7/188* (2013.01); *G08B 13/19676* (2013.01); *G08B 25/08* (2013.01); *H04N 5/23229* (2013.01); *H04N 7/18* (2013.01)

(58) Field of Classification Search
None
See application file for complete search history.

(56) References Cited

U.S. PATENT DOCUMENTS

| | | | | |
|---|---|---|---|---|
| 8,649,573 | B1* | 2/2014 | Darbari | G06K 9/00751 |
| | | | | 382/118 |
| 8,949,235 | B2 | 2/2015 | Peleg et al. | |
| 9,082,018 | B1* | 7/2015 | Laska | G06K 9/00711 |
| 2006/0117356 | A1* | 6/2006 | Jojic | G06F 17/30811 |
| | | | | 725/88 |
| 2012/0250944 | A1* | 10/2012 | Yamamoto | H04N 7/181 |
| | | | | 382/103 |

(Continued)

FOREIGN PATENT DOCUMENTS

| | | | |
|---|---|---|---|
| KR | 10-2003-0039193 A | | 5/2003 |
| KR | 10-2005-0018233 A | | 2/2005 |

(Continued)

*Primary Examiner* — Justin P. Misleh
(74) *Attorney, Agent, or Firm* — Sughrue Mion, PLLC (57) ABSTRACT

Provided is an image processing apparatus including at least one processor configured to implement: an image processing unit which receives at least one image captured by at least one camera, analyzing the captured image, and generates a summary image related to occurrence of an event among the captured image; and a controller which controls the image processor to generate the summary image in response to at least one of a user request received from a user terminal and a predetermined condition being satisfied.

26 Claims, 4 Drawing Sheets

(56) References Cited

U.S. PATENT DOCUMENTS

| | | | | |
|---|---|---|---|---|
| 2012/0300081 | A1* | 11/2012 | Kim | G08B 13/19656 |
| | | | | 348/159 |
| 2015/0350612 | A1* | 12/2015 | Brunson | H04N 5/2251 |
| | | | | 348/143 |
| 2015/0356996 | A1* | 12/2015 | Aghdasi | G11B 27/034 |
| | | | | 386/278 |
| 2016/0105598 | A1* | 4/2016 | Zeira | H04N 5/23203 |
| | | | | 348/143 |

FOREIGN PATENT DOCUMENTS

| | | |
|---|---|---|
| KR | 10-2006-0107703 A | 10/2006 |
| KR | 10-2009-0117771 A | 11/2009 |
| KR | 10-2013-0003886 A | 1/2013 |

* cited by examiner

APPARATUS AND METHOD FOR GENERATING A SUMMARY IMAGE BY IMAGE PROCESSING

CROSS-REFERENCE TO THE RELATED APPLICATION

This application claims priority from Korean Patent Application No. 10-2014-0152865, filed on Nov. 5, 2014, in the Korean Intellectual Property Office, the disclosure of which is incorporated herein in its entirety by reference.

BACKGROUND

1. Field

Apparatuses and methods consistent with exemplary embodiments relate to image processing for a home security system.

2. Description of the Related Art

As security systems, which have been mainly used for industrial purposes, buildings, and facilities, have expanded to homes, home cameras have been popularized. Security systems usually employed in large-scale facilities or buildings are managed by resident security managers and every image thereof is recorded and monitored. A home security system equipped with a home camera is operated differently from an existing system for which a resident security manager monitors a situation 24 hours. Upon the occurrence of an event, the home security system transmits an event situation to a registered user, but the user may or may not monitor the event situation.

SUMMARY

One or more exemplary embodiments provide an apparatus and method for generating and providing video summary information regarding an event of interest to a user having accessed a search range of a home security system and having succeeded in user authentication.

One or more exemplary embodiments provide an apparatus and method for applying a privacy function to a post-authentication user image to prevent arbitrary playback or transmission of the user image, if a user has accessed a search range of a home security system and has succeeded in user authentication.

Various aspects of the inventive concept will be set forth in part in the description which follows and, in part, will be apparent from the description, or may be learned by practice of the presented exemplary embodiments.

According to one or more exemplary embodiments, there is provided an image processing apparatus which includes at least one processor configured to implement: an image processing unit which receives at least one image captured by at least one camera, analyzing the captured image, and generates a summary image related to occurrence of an event among the captured image; and a controller which controls the image processor to generate the summary image in response to at least one of a user request received from a user terminal and a predetermined condition being satisfied. The processor may be further configured to implement an authentication processing unit which searches for the user terminal through wireless communication, to perform pairing with the user terminal, and performs user authentication through the user terminal, and the controller may control the image processing unit to generate the summary image if the user authentication is successful. Further, the controller may prevent transmission of the captured image to the user terminal or another display unit after the user authentication is successful.

The user request transmitted through the user terminal may include an indication of a predetermined image or audio information, and, in this case, the summary image generated by the image processing unit may include an image corresponding to the predetermined image or audio information.

The controller may transmit the summary image to the user terminal which is a mobile device. The controller may receive a control signal from the user terminal to control the image processing unit to generate the summary image, and, according to the control signal, transmit the summary image to the user terminal.

The image processing unit may store the captured image, the summary image, an event condition for triggering the occurrence of the event, audio information related to the occurrence of the event, and reference audio information to be compared with the audio information to determine the occurrence of the event.

When the controller controls the image processor to generate the summary image in response to the predetermined condition being satisfied without the user request, the predetermined condition may include at least one of appearance of an object, a change in color in the captured image, sensing a motion of an object, and arrival at a predetermined time.

The controller may control the camera to stop capturing an image, outputs a replacement image, or scrambles the captured image, after the user authentication is successful.

The controller may output an event notice to the user terminal if the user terminal is sensed within a predetermined distance.

The authentication processor may register information about a predetermined object received from the user terminal, and the controller may recognize the predetermined object from the captured image and control the image processing unit to generate the summary image related to the occurrence of the event and the predetermined object in response to the user request.

The authentication processor may register a password set corresponding to a user input and determine whether the user authentication is successful by comparing the registered password with a password received from the user terminal.

According to one or more exemplary embodiments, there is provided an image processing method which may include: receiving at least one image captured by at least one camera; and generating a summary image related to occurrence of an event among the captured image in response to at least one of a user request received from a user terminal.

The image processing method may further include searching for the user terminal through wireless communication, to perform pairing with the user terminal, and performing user authentication through the user terminal, and the summary image may be generated if the user authentication is successful.

The image processing method may further include setting a network address for the camera.

The image processing method may further include analyzing the captured image, and determining that the captured image is an abnormal image and triggering the occurrence of the event if a preset event condition is satisfied.

The generating of the summary image may include extracting image frames related to the occurrence of the event from the captured image and generating the summary image by compressing the extracted image frames.

The image processing method may further include registering wireless device information regarding the user terminal, in which the searching for the user terminal includes searching for a user terminal in which the wireless device information is registered.

The image processing method may further include registering a password set corresponding to a user input, in which the performing user authentication includes determining whether the user authentication is successful by comparing the registered password with a password received from the user terminal.

The image processing method may further include preventing transmission of the captured image to the user terminal or another display unit after the user authentication is successful.

The image processing method may further include: receiving a control signal from the user terminal, which is a mobile device, to generate the summary image; and, according to the control signal, transmitting the summary image to the user terminal or the display unit.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Reference will now be made in detail to exemplary embodiments which are illustrated in the accompanying drawings. Like reference numerals refer to like elements throughout the drawings. In this regard, the present embodiments may have different forms and should not be construed as being limited to the descriptions set forth herein. Accordingly, the exemplary embodiments are merely described below, by referring to the figures, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Advantages and characteristics of the inventive concept, and a method of achieving the advantages and characteristics will be clear with reference to an exemplary embodiment described below in detail together with the accompanying drawings. However, the inventive concept is not limited to the embodiments provided below, and may be implemented in different forms, and should be construed as including any change, equivalent, or substitute included in the spirit and technical range of the exemplary embodiments. The exemplary embodiments provided below are provided to complete the present disclosure and to completely inform those of ordinary skill in the art of the category of the exemplary embodiments. In the description of the present disclosure, a detailed description of a related known technique will not be provided if it obscures the subject matter of the exemplary embodiments.

The terms used in the present application are merely used to describe the exemplary embodiments, and are not intended to limit the inventive concept. Use of singular forms includes plural references as well, unless expressly specified otherwise. The terms "comprising", "including", and "having" specify the presence of stated features, numbers, steps, operations, elements, components, and/or a combination thereof but do not preclude the presence or addition of one or more other features, numbers, steps, operations, elements, components, and/or combinations thereof. While terms such as "first" and "second" may be used to describe various components, such components must not be limited to the above terms. The terms are used only to distinguish one component from another.

Hereinafter, the exemplary embodiments will be described in detail with reference to the attached drawings, and when a description is made with reference to the drawings, identical or corresponding components will be given identical or corresponding reference numerals and a repetitive description thereof will not be provided.

Figure 1:
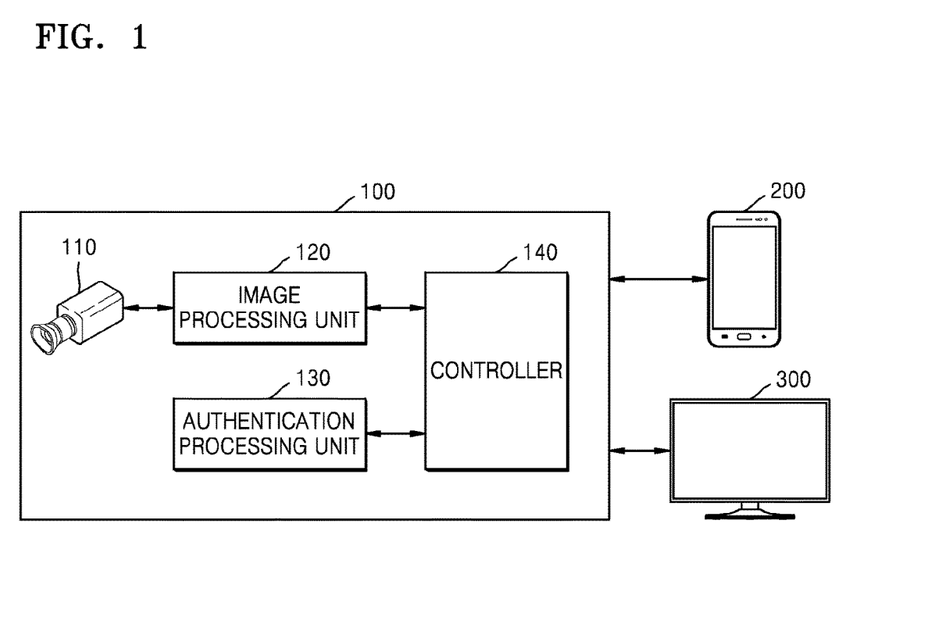
FIG. 1 is a block diagram illustrating a structure of a home security system including an image processing apparatus, according to an exemplary embodiment.

FIG. 1 is a block diagram illustrating a structure of a home security system including an image processing apparatus, according to an exemplary embodiment.

Referring to FIG. 1, the home security system may include an image processing apparatus 100, a user terminal 200, and a display unit 300.

The image processing apparatus 100, installed in an area of a home, captures an image in the home, stores the captured image, generates a summary image through image analysis, and stores the generated summary image. The image processing apparatus 100 outputs the captured image and/or the summary image to the user terminal 200 and/or the display unit 300 at the request of a user or at a predetermined time. According to an exemplary embodiment, the image processing apparatus 200 may generate the summary image if a predetermined event condition or a user-set event condition is satisfied even without the user request.

The image processing apparatus 100 may include a camera 110, an image processing unit 120, an authentication processing unit 130, and a controller 140. According to an exemplary embodiment, the image processing apparatus 100 may be configured without the camera 110, which may be connected to the image processing apparatus 100 through a wired and/or a wireless communication network.

One or more cameras 110 may be installed in a home to capture an image of a monitoring area, to output a captured image as a digital image signal to the image processing unit 120. For example, the camera 110 may be a single stationary camera including a speed dome camera or a fixed lens disposed at a fixed position in a particular place for a fixed capturing range. In another example, the camera 110 may be a pan-tilt-zoom (PTZ) camera having a variable capturing range. Herein, the PTZ camera may easily change a monitoring area by performing a pan operation for horizontal rotation, a tilt operation for vertical rotation, and a zoom-in/zoom-out operation.

The image processing unit 120 receives at least one captured image from the camera 110 and analyzes the captured image to generate a summary image including object information regarding an image, in which an event has occurred or occurs, from the capture image. The image processing unit 120 stores the captured image and/or a summary image.

The authentication processing unit 130 searches for the user terminal 200 accessing the home security system for wireless communication, performs pairing with the searched user terminal 200, and performs user authentication through the paired user terminal 200.

The controller 140 controls the image processing unit 120 to generate the summary image in response to a user request received from the user terminal 200 having succeeded in user authentication through the authentication processing unit 130, and outputs the generated summary image to the user terminal 200 and/or the display unit 300. If the user terminal 200 has succeeded in the user authentication through the authentication processing unit 130, the controller 140 may perform privacy processing to prevent play and/or transmission of the captured image received from the camera 110 after the success in the user authentication.

If the user terminal 200 has succeeded in the user authentication in response to an authentication request from the image processing apparatus 100 electrically connected thereto, the user terminal 200 may control operations of the image processing apparatus 100 or output the captured image and/or the summary image received from the image processing apparatus 100. The expression "electrically connected" may mean "connected to exchange data through a wired and/or wireless communication network" as well as "two or more members being connected through an electric wire or an electronic circuit therebetween".

According to an exemplary embodiment, the user terminal 200 downloads and executes an application capable of controlling the home security system. The user terminal 200 may be a computer device capable of communicating with the image processing apparatus 100 through a wired and/or wireless communication network, such as a mobile terminal, e.g., a laptop computer, a handheld device, a smartphone, a tab, a tablet personal computer (PC), or the like, a desktop computer, or an arbitrary device using the foregoing device or directly or indirectly connected thereto.

The display unit 300 outputs a captured image and/or a summary image received from the electrically connected image processing apparatus 100. The display unit 300 displays an image received from the image processing apparatus 100, and may include a device connected with a TV or a set-top box (not shown) to display an image and a device capable of performing a projection function. The display unit 300 may include at least one of a liquid crystal display (LCD), a thin film transistor (TFT) LCD, an organic light-emitting diode (OLED), a flexible display, and a third-dimensional (3D) display. When the display unit 300 and a touch pad are implemented as a touch screen by forming a mutual-layer structure, the display unit 300 may also be used as an input device as well as an output device.

Figure 2:
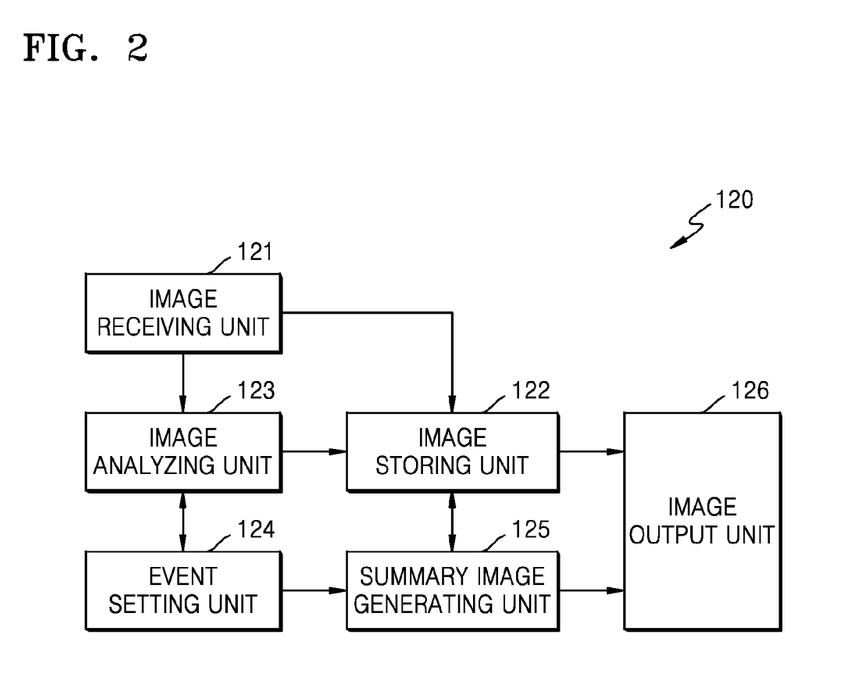
FIG. 2 is a detailed structural diagram of an image processing unit of an image processing apparatus, according to an exemplary embodiment.

FIG. 2 is a detailed structural diagram of the image processing unit 120 of the image processing apparatus 100, according to an exemplary embodiment.

Referring to FIG. 2, the image processing unit 120 may include an image receiving unit 121, an image storing unit 122, an image analyzing unit 123, an event setting unit 124, a summary image generating unit 125, and an image output unit 126.

The image receiving unit 121 receives at least one captured image from the camera 110. The image receiving unit 121 sets a network address of the camera 110 and receives the captured image transmitted from the camera 110 for which the network address is set. The captured image received by the image receiving unit 121 may be an encoded image.

The image storing unit 122 stores the captured image, a summary image, and a user-set event condition, object information and event information regarding an event-occurring image among the at least one capture image. The image storage may also store audio information (or a sound source) regarding the event-occurring image, a replacement image for privacy processing, reference audio information (or a reference sound source), and so forth.

The image analyzing unit 123 performs an image analysis algorithm for analyzing the captured image, and triggers occurrence of an event if the event condition is satisfied. The image analyzing unit 123 performs the image analysis algorithm and recognizes appearance and/or disappearance of an object on a screen, image tracking on an object having a form that is similar with a user-input image, sensing a motion of an object, an image-off phenomenon, and so forth. If the event condition is satisfied as a result of the image analysis algorithm performed by the image analyzing unit 123, the image analyzing unit 123 determines that the captured image is an abnormal image and triggers the occurrence of an event.

The image analyzing unit 123 separates an object from a background in an event-occurring image, and extracts object information including object classification information and object attribute information from the event-occurring object. The home security system according to the present exemplary embodiment determines whether a trespassing object is a person or not, if sensing a trespass by the object. The object classification information may be information for determining whether a motion-sensed object is a person or an animal, and the object attribute information may be information about a color, a size, and an area of the object. The image analyzing unit 123 stores object information and event information regarding an event-occurring image together in the image storing unit 122. The event information may include time information about a time when the event occurs.

The image analyzing unit 123 analyzes audio information (or a sound source) related to the captured image, and triggers occurrence of an event if a preset event condition is satisfied. The image analyzing unit 123 analyzes the audio information related to the captured image to determine whether a volume of the audio related to the captured image is greater than a user-set threshold value or is the same as user-specified audio information. If the event condition is satisfied as a result of determination based on the analysis of the audio information related to the captured image, the image analyzing unit 123 determines that a captured image is an abnormal image and triggers the occurrence of an event. For example, the image analyzing unit 123 may trigger an event if the audio information related to the captured image matches reference audio information stored in the image storing unit 122. The image analyzing unit 123 stores the audio information related to the event-occurring image and the event information regarding the event-occurring image together in the image storing unit 122.

The event setting unit 124 sets an event condition used for image analysis and/or audio information analysis according to a user input. The event condition used for image analysis may include appearance of an object, appearance of a user-input image, a color change in the screen, sensing a motion of an object, and so forth. The event condition used for audio information analysis may include generation of an abnormal sound, generation of a user-specified sound, generation of a sound having a volume greater than a threshold value, and so forth. The abnormal sound may include a friction sound of vehicle tires, a broken glass sound, an alarm sound, a collision sound, and so forth. The user-specified sound may include a shouting sound of a man, a screaming sound of a woman, a cry sound of a baby or a child, and so forth. The event setting unit 124 may set an arbitrary time zone, for example, from 7 pm to 8 pm, as the event condition.

The summary image generating unit 125 uses object information and event information regarding an event-occurring image and/or audio information and event information regarding the event-occurring image, which have been stored in the image storing unit 122, to extract at least one image frame including the object information and the event information and/or the audio information and the event information, and generates a summary image by compressing the extracted image frames. The summary image generating unit 125 may arrange the at least one extracted image frame by time and compress the at least one image frame into one image file.

The image output unit 126 decodes a captured image and/or a summary image to output the decoded image to the user terminal 200 and/or the display unit 300. The image output unit 126 transmits the captured image and/or the summary image to an application capable of controlling the home security system to output the image on the screen of the user terminal 200, to stream and output the image to the TV or the set-top box, to output the image through a Video Graphics Array (VGA) connector or an High-Definition Multimedia Interface (HDMI) cable, or to output the image by using the projection function included in the home security system.

Figure 3:
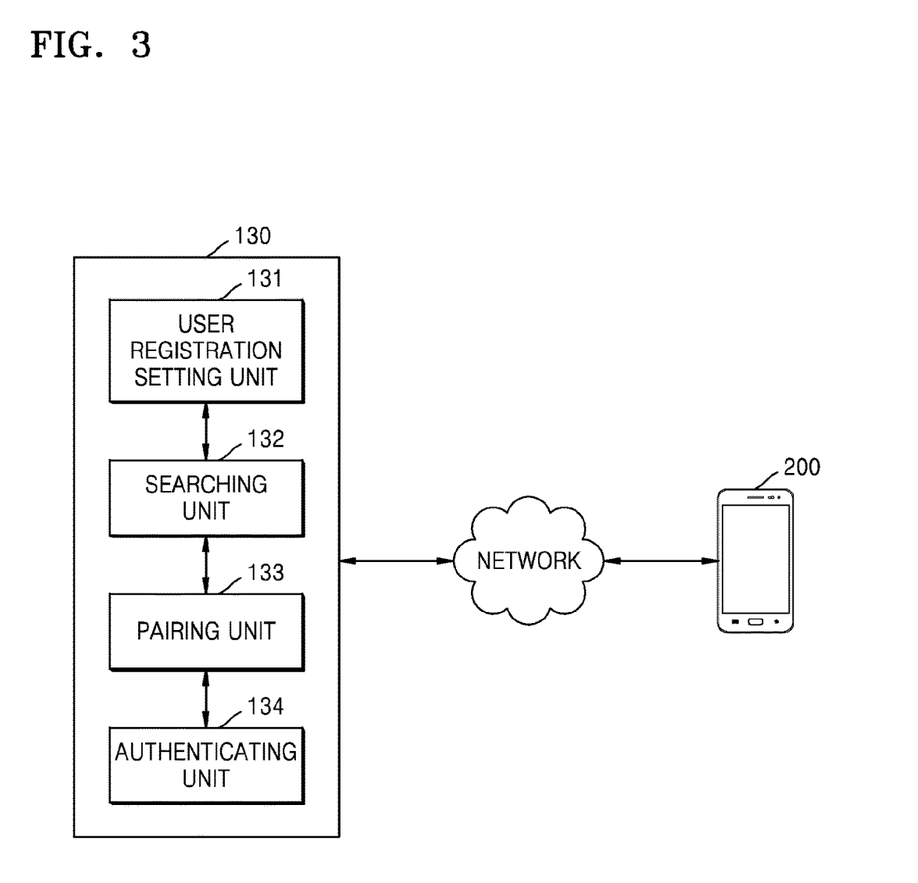
FIG. 3 is a detailed structural diagram of an authentication processing unit of an image processing apparatus, according to an exemplary embodiment.

FIG. 3 is a detailed structural diagram of the authentication processing unit 130 of the image processing apparatus 100, according to an exemplary embodiment.

Referring to FIG. 3, the authentication processing unit 130 may include a user registration setting unit 131, a searching unit 132, a pairing unit 133, and an authenticating unit 134.

The user registration setting unit 131 registers therein wireless device information and a user-set password for the user terminal 200.

The user registration setting unit 131 may register user face information together with the wireless device information for the user terminal 200. The user face information may be set in advance by the user. The user face information may include, for example, information about faces of the user's family, relatives, children, and so forth.

The searching unit 132 searches for nearby devices by using a service discovery profile (SDP) to detect the user terminal 200 corresponding to the wireless device information registered in the user registration setting unit 131.

The pairing unit 133 performs wireless communication with the user terminal 200 detected by the searching unit 132. The pairing may mean enabling the image processing apparatus 100 and the user terminal 200 to recognize each other.

The authenticating unit 134 transmits a password input request to the user terminal 200 having paired therewith and determines whether authentication succeeds or fails by comparing a password received from the user terminal 200 with the password registered in the user registration setting unit 131.

The success in authentication means that a user of the user terminal 200 accesses the home security system, that is, the user arrives at home.

According to an exemplary embodiment, after the success in the authentication, the controller 140 controls the camera 110 to stop capturing an image, replaces the image output from the image processing apparatus 100 by a replacement image, or controls the image processing unit 120 to perform a privacy function of scrambling the captured image. According to another exemplary embodiment, after the success in the authentication, the controller 140 controls the image processing unit 120 to generate a summary image and outputs the summary image to the user terminal 200 or the display unit 300.

According to another exemplary embodiment, if the image processing apparatus 100 and the user terminal 200 are spaced apart by a distance in which pairing therebetween is not possible, the controller 140 performs a remote connection function to perform authentication in response to a user request from the user terminal 200 and to output a summary image to the user terminal 200.

According to another exemplary embodiment, the controller 140 recognizes a location of a user having the user terminal 200 by interworking with a global positioning system (GPS) function of the user terminal 200, and if the location of the user is sensed as being within a predetermined distance from the image processing apparatus 100, the controller 140 transmits information the user needs to know in advance to the user terminal 200. For example, if an event, such as illegal intrusion into a house or a trespass into the house, occurs and the user's location is detected near the home, the controller 140 outputs an event situation to the user terminal 200 to inform the user of information about the illegal intrusion.

If information about a user's face is registered in the user registration setting unit 131, the controller 140 controls the image processing unit 120 to extract object information from at least one captured image to recognize the user's face. Once the user's face is recognized, the controller 140 stores information about the recognized user's face and the registered information about the user's face as the object information in the image storing unit 122. Information associated with the registered user, for example, user identification information may be recorded and stored together with the object information in the image storing unit 122. For example, the user may input desired user identification information through the user terminal 200, and the controller 140 may control the summary image generating unit 125 to generate a summary image regarding a part in which the input user identification information has been recorded, in response to a user request from the user terminal 200.

For example, if the user desires to check a summary image regarding a part in which images of children of the user are captured for a predetermined time, the image processing apparatus 100 may generate a summary image including face information of the children out of user face information recognized in response to a user request transmitted through the user terminal 200.

In another example, upon receiving, from the user terminal 200, a user request regarding a part in which an image of a non-registered object is captured, the image processing apparatus 100 extracts image frames including event information associated with an unknown object by using object information to generate a summary image.

Figure 4:
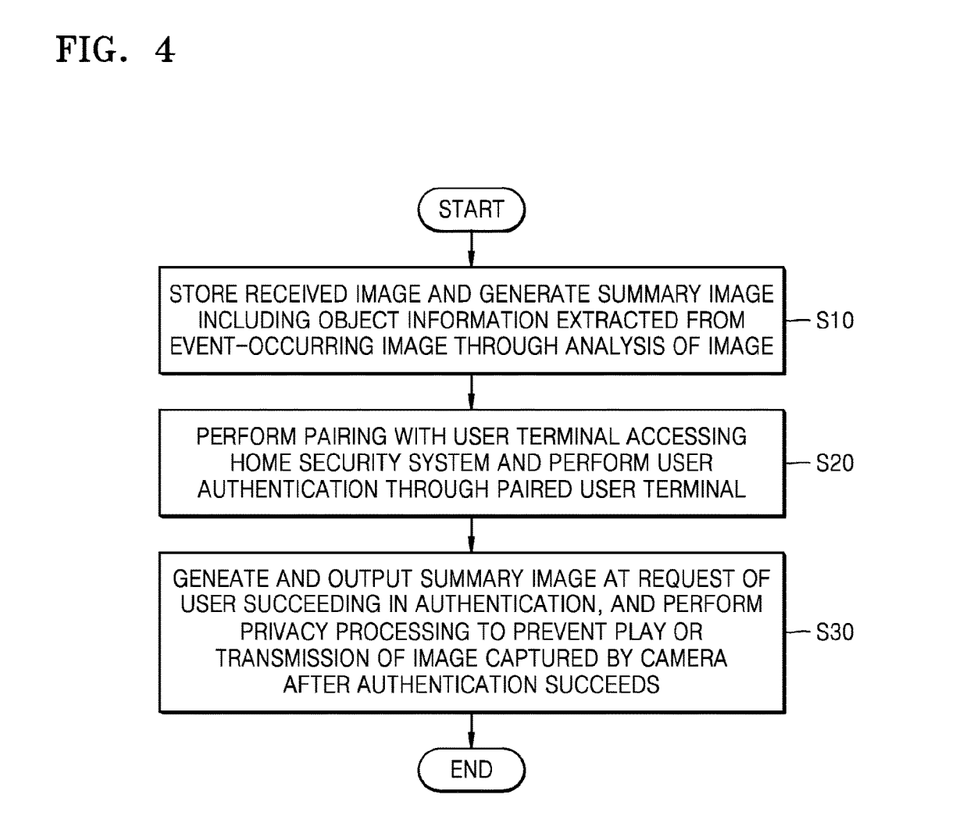
FIG. 4 is a flowchart illustrating operations of an image processing method, according to an exemplary embodiment.

FIG. 4 is a flowchart illustrating operations of an image processing method, according to an exemplary embodiment.

Referring to FIG. 4, the image processing apparatus 100 stores at least one captured image received from the camera 110, generates a summary image in which object information is extracted from an event-occurring image among the at least one captured image through analysis of the at least one captured image, and stores the summary image in operation S10.

According to an exemplary embodiment, the image processing apparatus 100 receives and stores face information of the user or face information of another user set by the user, and receives a user request including the user-set face information from the user terminal 200. The image processing apparatus 100 analyzes the at least one captured image received from the camera 110 to extract the event-occurring image, and extracts an image associated with the user-set face information from the event-occurring image to generate and store the summary image.

The image processing apparatus 100 searches for the user terminal 200 near the home security system through wireless communication, performs pairing with the searched user terminal 200, and performs user authentication through the paired user terminal 200 in operation S20.

The image processing apparatus 100 generates and outputs the summary image in response to the user request received from the user terminal having succeeded in authentication, and performs privacy processing not to play or transmit the captured image through the camera 110 after the success in authentication in operation S30. The image processing apparatus 100 stops capturing an image through the camera 110, replaces the image captured by the camera 110 by a replacement image, or scrambles the image captured by the camera 110.

According to an exemplary embodiment, image summary information regarding an event of interest may be generated and provided to a user having accessed a search range of the home security system and having succeeded in authentication.

Once the user has accessed the search range of the home security system and has succeeded in authentication, a privacy function may be applied to a user image after the success in authentication to prevent arbitrary play or transmission of the user image.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 1-3 (e.g., image processing unit 120, image analyzing unit 123, authenticating unit 134, etc.) may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

In the specification, particularly, in claims, the term "the" and designation terms similar thereto may correspond to both a singular form and a plural form. Also, when there is disclosed a range, the inventive concept to which separate values belonging to the range are applied are included if there is no contrary description, which is identical to setting forth separate values forming the range, respectively. When there is not a clearly described sequence of operations forming a method according to an exemplary embodiment or there is no description contrary thereto, the operations may be performed in a proper sequence. The inventive concept is not necessarily limited by the described sequence of the operations. The use of any examples, or exemplary term (e.g., "such as") provided herein, is intended merely to better illuminate the exemplary embodiments and does not pose a limitation on the scope of the inventive concept unless otherwise claimed. In addition, those of ordinary skill in the art may recognize that the exemplary embodiments may be constructed according to a designing condition and a factor in the claims to which various modifications, combinations, and changes are added or in the category of their equivalents.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An image processing apparatus comprising:
an image processor which receives at least one image captured by at least one camera, analyzes the at least one captured image, and generates a summary image related to occurrence of an event among the at least one captured image, wherein the generating the summary image comprises extracting at least one image frame from the at least one captured image, arranging the at least one image frame by time, and compressing the at least one image frame into one image frame;
a control processor which controls the image processor to generate the summary image in response to at least one of a user request being received from a user terminal and a predetermined condition being satisfied;
an authentication processor which registers face information of a user, and performs user authentication through the user terminal; and
an image storage which stores object information extracted from the at least one captured image to recognize a face,
wherein the control processor selectively operates in one of a video summary mode and a privacy masking mode depending on results of the user authentication and the recognizing the face,
wherein the control processor, in the video summary mode, controls the image processor to, in response to the user request including a user identification of the user, generate, based on the stored object information, the summary image that includes the registered face information of the user, and
wherein the control processor, in the privacy masking mode, performs at least one of replacing the at least one captured image with a replacement image and scrambling the at least one captured image, after the user authentication is successful.

2. The image processing apparatus of claim 1, wherein the authentication processor searches for the user terminal through wireless communication to perform pairing with the user terminal, and performs the user authentication through the user terminal.

3. The image processing apparatus of claim 2, wherein the control processor prevents transmission of the at least one captured image to one of the user terminal and a display unit after the user authentication is successful.

4. The image processing apparatus of claim 2, wherein the control processor controls the image processor to generate the summary image in response to the user request,
wherein the user request comprises an indication of a predetermined image or audio information, and
wherein the summary image comprises an image corresponding to the predetermined image or audio information.

5. The image processing apparatus of claim 4, wherein the control processor transmits the summary image to the user terminal which is a mobile device.

6. The image processing apparatus of claim 5, wherein the control processor receives a control signal from the user terminal to control the image processor to generate the summary image, and, according to the control signal, transmits the summary image to the user terminal.

7. The image processing apparatus of claim 1, wherein the image processor stores the at least one captured image, the summary image, an event condition for triggering the occurrence of the event, audio information related to the occurrence of the event, and reference audio information to be compared with the audio information to determine the occurrence of the event.

8. The image processing apparatus of claim 1, wherein the control processor controls the image processor to generate the summary image in response to the predetermined condition being satisfied without the user request, and
wherein the predetermined condition comprises at least one of appearance of an object, a change in color in the at least one captured image, sensing a motion of the object, and arrival at a predetermined time.

9. The image processing apparatus of claim 8, wherein the control processor transmits the summary image to the user terminal which is a mobile device.

10. The image processing apparatus of claim 9, wherein the control processor receives a control signal from the user terminal to control the image processor to generate the summary image, and, according to the control signal, transmits the summary image to the user terminal.

11. The image processing apparatus of claim 1, wherein the control processor controls the at least one camera to stop capturing the at least one image after the user authentication is successful.

12. The image processing apparatus of claim 1, wherein the control processor outputs an event notice to the user terminal if the user terminal is sensed within a predetermined distance.

13. The image processing apparatus of claim 1, wherein the control processor controls the image processor to generate the summary image in response to the user request,
wherein the authentication processor registers information about a predetermined object received from the user terminal, and
wherein the control processor recognizes the predetermined object from the at least one captured image and controls the image processor to generate the summary image related to the occurrence of the event and the predetermined object in response to the user request.

14. The image processing apparatus of claim 1, wherein the control processor operates in the video summary mode in response to the user authentication being successful.

15. The image processing apparatus of claim 1, wherein the control processor operates in the privacy masking mode in response to the user authentication being successful and the face being recognized.

16. A method of image processing using at least one processor, the method comprising:
receiving at least one image captured by at least one camera;
in response to at least one of a user request received from a user terminal, generating a summary image related to occurrence of an event among the at least one captured image by extracting at least one image frame from the at least one captured image, arranging the at least one image frame by time, and compressing the at least one image frame into one image frame;
registering face information of a user;
extracting object information from the at least one captured image to recognize a face and storing the object information;
performing user authentication through the user terminal; and
selectively operating in one of a video summary mode and a privacy masking mode depending on results of the user authentication and the recognizing the face,
wherein, in the video summary mode, the generating the summary image comprises, in response to the user request including a user identification of the user, generating, based on the stored object information, the summary image that includes the registered face information of the user, and wherein, in the privacy masking mode, after the user authentication is successful, performing at least one of replacing the at least one captured image with a replacement image and scrambling the at least one captured image.

17. The method of claim 16, further comprising preventing transmission of the at least one captured image to one of the user terminal and a display unit after the user authentication is successful.

18. The method of claim 16, wherein the summary image is generated in response to the user request, wherein the user request comprises an indication of a predetermined image or audio information, and wherein the summary image comprises an image corresponding to the predetermined image or audio information.

19. The method of claim 18, further comprising:

receiving a control signal from the user terminal, which is a mobile device, to generate the summary image; and according to the control signal, transmitting the summary image to one of the user terminal and a display unit.

20. The method of claim 16, wherein the summary image is generated in response to a predetermined condition being satisfied without the user request, and wherein the predetermined condition comprises at least one of appearance of an object, a change in color in the at least one captured image, sensing a motion of the object, and arrival at a predetermined time.

21. The method of claim 16, further comprising: receiving a control signal from the user terminal, which is a mobile device, to generate the summary image; and according to the control signal, transmitting the summary image to one of the user terminal and a display unit.

22. The method of claim 16, wherein the video summary mode is selected in response to the user authentication being successful.

23. The method of claim 16, wherein the privacy masking mode is selected in response to the user authentication being successful and the face being recognized.

24. A method of image processing using at least one processor, the method comprising:

receiving at least one image captured by at least one camera;

registering face information of a user;

extracting object information from the at least one captured image to recognize a face and storing the object information;

performing user authentication through the user terminal;

selectively operating in one of a video summary mode and a privacy masking mode depending on results of the user authentication and the recognizing the face; and in the video summary mode, in response to a user request for an image of a non-registered object, generating, based on the stored object information, a summary image that includes the non-registered object by extracting at least one image frame from the at least one captured image including the object information, arranging the at least one image frame by time, and compressing the at least one image frame into one image frame, wherein, in the privacy masking mode, after the user authentication is successful, performing at least one of replacing the at least one captured image with a replacement image and scrambling the at least one captured image.

25. The method of claim 24, wherein the video summary mode is selected in response to the user authentication being successful.

26. The method of claim 24, wherein the privacy masking mode is selected in response to the user authentication being successful and the face being recognized.

\* \* \* \* \*